United States Patent [19]

Carré et al.

[11] 4,448,090

[45] May 15, 1984

[54] DEVICE FOR AUTOMATICALLY TAKING UP PLAY IN A MECHANICAL CONTROL

[75] Inventors: Jean-Jacques Carré, Montreuil; Alain Thioux, Chennevières, both of France

[73] Assignee: Societe Anonyme DBA, Paris, France

[21] Appl. No.: 263,613

[22] Filed: May 14, 1981

[30] Foreign Application Priority Data

May 14, 1980 [FR] France ................ 80 10873

[51] Int. Cl.³ .............................................. F16C 1/10
[52] U.S. Cl. ........................... 74/501.5 R; 192/111 A
[58] Field of Search ............... 74/501.5 R; 188/196 B, 188/200; 192/111 A, 70.25; 403/314

[56] References Cited

U.S. PATENT DOCUMENTS

| 1,936,530 | 11/1933 | Taylor | 188/196 B |
| 3,200,912 | 8/1965 | Martin | 188/200 X |
| 3,430,745 | 3/1969 | Randel | 192/111 A |
| 4,016,959 | 4/1977 | Menard et al. | 188/200 X |
| 4,057,135 | 11/1977 | Mori | 192/111 A |
| 4,304,322 | 12/1981 | Beccaris | 192/111 A |

Primary Examiner—Allan D. Herrmann
Assistant Examiner—Frank McKenzie
Attorney, Agent, or Firm—Paul David Schoenle; Ken C. Decker

[57] ABSTRACT

Device for automatically taking up play designed to be inserted between two consecutive portions of a mechanical control.

The device includes two telescopic connecting parts (32, 34), which are movable in the axial sense within a fixed casing (22), and are respectively connected to consecutive portions (10, 12) of the control and releasable lock (66) which operate unidirectionally when the connecting parts move in the linear sense, characterized in that the lock comprises a component constituting a cam or eccentric (66) pivotally mounted on one of the connecting parts (32) so as to come into engagement with a surface (76) arranged opposite it on the other of the connecting parts (34) when the control is operated in an axial sense so as to provide, as a result of a wedging action, locking of the two connecting parts in the sense of linear movement.

7 Claims, 4 Drawing Figures

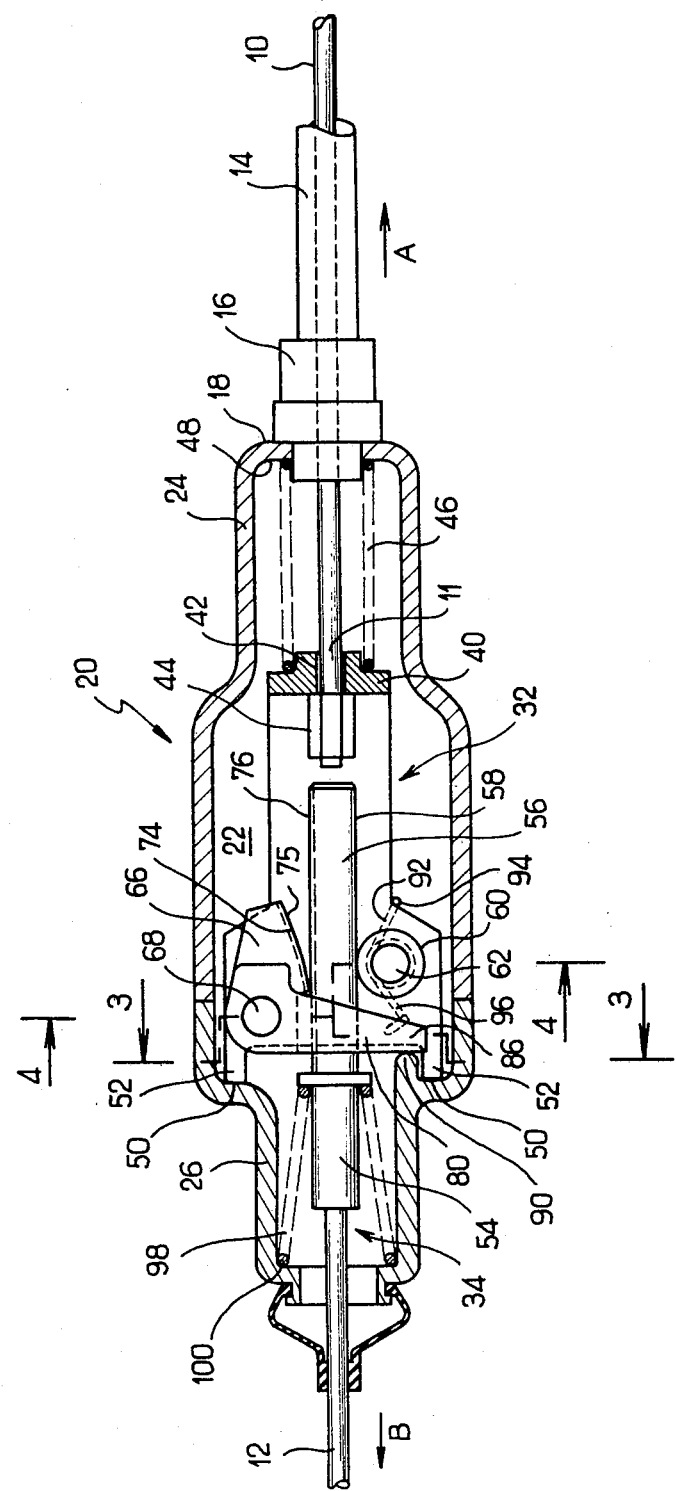
FIG_1

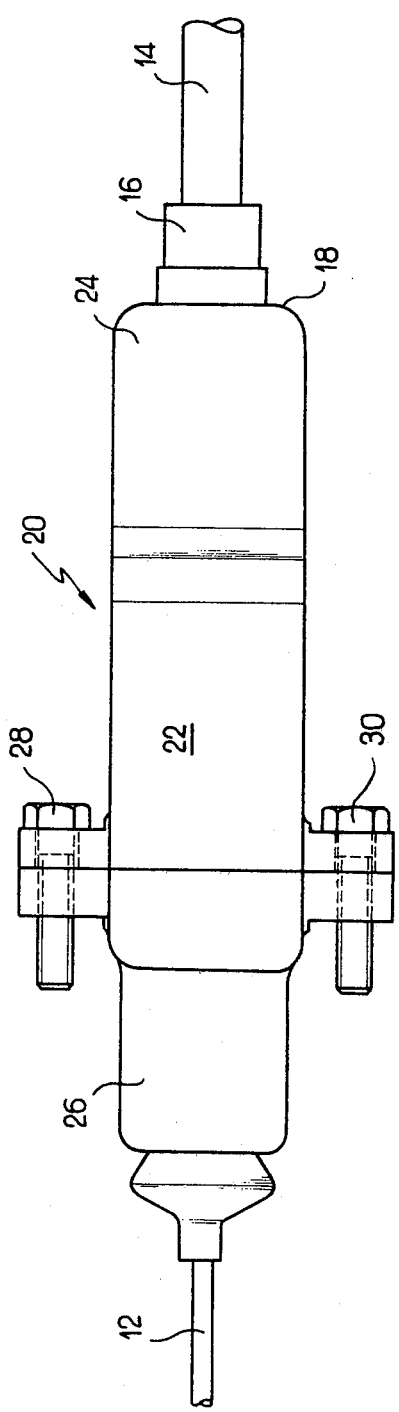
FIG_2
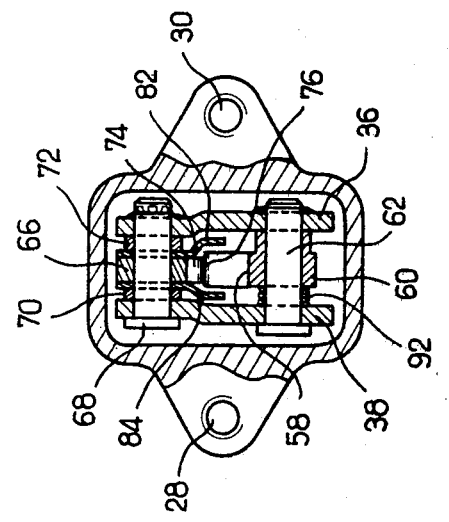
FIG_4
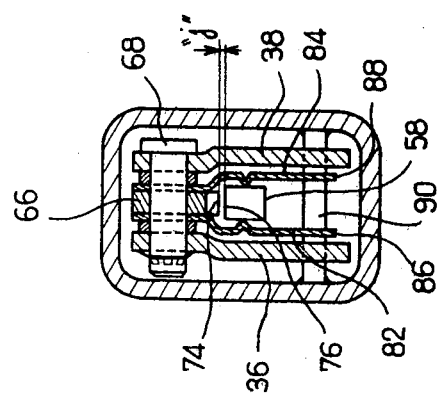
FIG_3

DEVICE FOR AUTOMATICALLY TAKING UP PLAY IN A MECHANICAL CONTROL

The present invention relates to a device for automatically taking up play, designed to be inserted between two consecutive portions of a mechanical control.

More particularly, the invention concerns a device for mechanical control using a cable sliding axially in a flexible sheath. Such mechanical controls are known and in these the two ends of the outer flexible sheath abut against two cup-like stops rigidly fixed to a framework. When a mechanical control of this type is used for operating the clutch of a motor vehicle, for example a clutch of the single-plate dry type, wear of the clutch linings resulting from successive engagements and disengagements of the clutch, leads to the appearance of increasing play between the various parts of the mechanical clutch control. If no device for taking up play is provided, the rest position of the clutch operating pedal varies gradually until it reaches a final position, which corresponds to the maximum wear of the clutch linings, in which the pedal is raised by several centimeters with respect to its initial rest position corresponding to its position when the clutch linings were new.

The invention provides a device for automatically taking up play in a mechanical control, which can be fitted between two consecutive portions of an existing mechanical control such as, for example, a mechanical control using a cable in order to provide automatic take up of play which might appear as a result of repeated operation of this control.

With this aim in mind, the invention puts forward a device for automatically taking up play intended to be inserted between two consecutive portions of a mechanical control and consists of two telescopic connecting parts, which are movable in the axial sense within a fixed casing, and are respectively connected to said consecutive portions of the control, and releasable locking means which operate unidirectionally when said connecting parts move in the linear sense, characterised in that said locking means comprise a component forming a cam or eccentric which is pivotally mounted on one of said connecting parts so as to come into engagement with a surface arranged opposite it on the other of said connecting parts when said control is operated in an axial sense so as to provide, as a result of a wedging action, said locking of the two connecting parts in the sense of linear movement.

It will be readily understood that such a device can easily be inserted in an existing mechanical control and that it does notably allow the transmission of fairly high forces, locking in the sense of linear movement of the two connecting parts being provided by the wedging action of an eccentric component which has a self-locking effect on the second connecting part.

The present invention will now be described with reference to the attached drawings in which:

FIG. 1 is an axial cross-section of the device for automatically taking up play according to the invention;

FIG. 2 is a plan view of the device shown in FIG. 1;

FIG. 3 is a cross-sectional view according to line 3—3 in FIG. 1; and

FIG. 4 is a cross-sectional view according to line 4—4 in FIG. 1.

In the embodiment shown in FIGS. 1 to 4, the devices for automatically taking up play 20 which constitutes the object of the invention is inserted between two consecutive portions 10 and 12 of a mechanical control, using a cable, for the clutch of a motor vehicle (which is not shown). The portion 10 is connected to the clutch operating pedal (not shown) and the portion 12 is connected to the clutch operating fork of the vehicle. The device for automatically taking up play 20 comprises a fixed casing 22 consisting of two separate parts 24 and 26 which are assembled together by means of screws 28 and 30 (see FIG. 2) which also provide for attachment of the casing 22 onto a fixed wall of a vehicle (not shown). The device 20 comprises a first connecting part 32 connected to the end 11 of the cable portion 10. The sheath 14 of the cable portion 10 abuts against one outer end face 18 of the portion of casing 24 using a cable cup 16. The device further comprises another connecting part 34 which is connected to the second portion 12 of the control cable. The two connecting parts 32 and 34 are telescopic and axially movable in the casing 22. The connecting part 32 comprises a fork member made up of two parallel arms 36, 38 which are rigidly fixed to an end portion 40. The end 11 of cable portion 10 penetrates into a passage 42 provided on the part 40. A ferrule 44 is crimped onto the end 11 of the cable 10 to prevent the latter from escaping through the passage 42 so as to connect the portion 10 to the first connecting part 32. It will be seen that the forked member 32 becomes displaced to the right (FIG. 1) with respect to the casing 22 when an operator applies an axial force to the cable portion 10 in the direction shown by the arrow A in FIG. 1. The forked member 32 is urged towards its rest position (which is the position shown in the drawings) by a first coil spring 46 which abuts against one internal end face 48 of the casing 32 in order to urge the forked member 32 to abut against a first abuttment surface 50 formed on the portion 26 of the casing 22. In this rest position, the ends 52 of the arms 36, and 38 of the forked member 32 are in abuttment with the first abuttment surface 50.

A first end 54 of the second connecting part 34 is crimped to the end of the second cable portion 12. The second end 56 of the second connecting part 34 is rectangular in cross-section and has its lower face 58 in abuttment with a ring 60 rotatably mounted on a pivot pin 62 pivotally mounted in corresponding passages of the arm 36 and 38. The end 56 of the second connecting part 34 is thus able to slide in the axial sense with respect to the first connecting part 32 whilst abutting against the rotating ring 60.

According to the invention the device for taking up play 20 also includes releasable means for unidirectionally locking the linear motion of the two connecting parts 32 and 34. The locking means comprise a component forming a cam or eccentric 66 which is pivotally mounted on a pivot pin 68. The pivot pin 68 is perpendicular to the axis of displacement of the connecting part 32 and 34 and is fitted into corresponding passages provided in the arms 36 and 38 of the forked member 32. The component forming the eccentric 66 has a portion 74, the substantially circular outer profile of which is eccentric with respect to the shaft 68 and is designed to come into engagement with the surface arranged to face it provided on the upper portion 76 of the end 56 of the second connecting part 34. The portion 74 of the cam 66 and the surface 76 of the end 56 are provided, respectively, with teeth designed to engage with each other when the control is operated in a manner which will be described below. The component forming the eccentric 66 includes an operating body 80 rigidly fixed in rotation to the portion 74 of the eccentric 66. As can be seen from FIGS. 3 and 4, the operating body 80 is made up by two parallel arms 82, 84 made of sheet metal and arranged at one and the other side of the portion 74 of the eccentric 66. As can again be seen in FIGS. 3 and 4, the components forming the eccentric 66 is maintained between the two arms 36 and 38 of the forked member 32 by means of spacer washers 70 and 72 which are arranged at both sides of the arms 82, 84 of the operating body 80 and between the arms 36 and 38. In the rest position shown, the ends 86 and 88 of the arms 82 and 84 constituting the operating body 80 are in abutment against a second abutment surface 90 formed on the portion 26 of the casing 22. In this position, and as can in particular be seen from FIGS. 3 and 4, a certain amount of play "j" exists between the outer surface 75 of the teeth formed on the portion 74 and the outer surface of the teeth formed on the face 76 of the end 56. It will readily be seen that, thanks to this degree of play "j", the second connecting part 34 is free to move in the axial sense with respect to the first connecting part 32 when the various components of the device 20 are in the rest positions as shown here.

In accordance with another aspect of the invention, a second spring 92 is provided for urging the eccentric 66 to rotate about its pivot pin 68 in the clockwise sense in FIG. 1. This spring is made up in the embodiment shown, by a spiral spring coiled about its axis 62 and this spring has one of its ends 94 attached to the forked member 32 whilst the other end 96 urges the arm 84 of the operating body 80 to rotate in the clockwise direction.

The automatic adjusting device 20 further includes a third spring 98 which abuts against one internal end face 100 of the portion of the casing 26 for permanently urging the second connecting part 34 in the direction indicated by arrow A.

All the components of the device 20 are shown in the diagrams in the position in which they occupy at rest, and where the clutch is provided with new linings.

The device operates in the following manner: when the driver exercises a force, for example via the clutch pedal, on the first portion 10 of the cable of the mechanical control, it leads to displacement of the forked member 32 in the sense indicated by the arrow A against the opposing force provided by the spring 46. When this displacement occurs, the ends 52 of the arms 36 and 38 of the forked member 32 leave the abutment surface 50 of the casing 22. At the same time, the pivot pin 68 connected to the arms 36 and 38, also becomes displaced in the sense indicated by arrow A. As a result of the force exercised by the spring 92 on the arm 84 of the operating body 80, the component forming the eccentric 66 pivots in the clockwise sense about pivot pin 68. This pivotting is transferred to the outer profile of the portion 74 of the eccentric 66 and causes engagement of the portion 74 with the upper face 76 of the second connecting part 34. The force applied to the forked member 32 by the cable 10 is then transmitted to the second cable portion 12 via the pivot pin 68, the cam portion 74 and the second end 56 of the connecting part 34. As a result of the teeth formed on the eccentric 66 and on the connecting part 34, and of the self-locking effect of the eccentric 66, the telescopic connecting pieces 32 and 34 are immobilised in linear motion with respect to each other and are thus able to transmit considerable tractional forces applied to the first cable portion 10 to the second cable 12.

When the operator releases the force on the cable portion 10, the first connecting part, or forked member 32, becomes displaced to the left in the sense indicated by arrow B under the force exercised on it by the spring 46 up till the point where the ends 52 of the arms 36 and 38 come into contact with the abutment surface 50 of the casing 22 to then once again take up the positions shown in the drawings. In this position, the second connecting part 34 is once again free to move in the axial sense with respect to the connecting part 32.

The spring 98 keeps the second cable portion 12 stretched whatever the degree of elongation of the latter may be, and opposses any inopportune movement of the cable 12. Since the second connecting part 34 is free to move in the axial sense with respect to the first connecting part 32, when the components of the mechanical control are in their rest position, the device makes it possible to automatically take up any play which might appear in the portion 12 of the mechanical control and particularly, play which results from wear of the clutch linings of the clutch with which the second cable portion 12 is associated, as well as any play originating from elongation or shrinking of this last portion of cable. What actually happens is that, as the clutch linings gradually become worn (which are not shown) and under the action of the return spring provided for the clutch, the cable portion 12 becomes progressively displaced in the sense indicated by arrow B in FIG. 1 and carries with it the connecting parts 34 against the opposing force provided by spring 98, this force being selected so as to be less than that exercised by the return spring for the clutch plate.

We claim:

1. A compensating device for a mechanical control linkage adapted to be arranged between two consecutive portions of said control linkage and comprising first and second axially telescopic connecting parts movable axially within a stationary casing and respectively connected to said consecutive portions of said control linkage, releasable coupling means for selectively coupling said first and second connecting parts together for axial movement in one axial direction, said coupling means comprising an eccentric member pivotally mounted on said first connecting part and resiliently biased to come into engagement with an adjacent surface of said second connecting part, and a lever means coupled to said eccentric member and cooperating in engagement with a first abutment surface in said casing to release said coupling means when said control linkage is not actuated in said one axial direction.

2. A device according to claim 1, wherein said first connecting part is resiliently biased in the direction opposite to said one axial direction so as to cooperate in engagement with a second abutment surface in said casing, whereby defining a rest position in the opposite direction for said connecting part when said control linkage is not actuated.

3. A device according to claim 2, wherein said second connecting part is permanently biased towards said one axial direction.

4. A device according to claim 1, wherein said second connecting part is slidably supported on a guide surface formed on said first connecting part.

5. A compensating device for a mechanical control linkage adapted to be interposed between two coaxial separate portions of said control linkage, said device comprising two connecting parts respectively connected to said portions of said control linkage and normally telescoping axially one relative to the other in a rest condition of said device, and means for temporarily coupling said connecting parts together for movement in one axial direction upon actuation of said control linkage, wherein a first of said connecting parts is resiliently biased in the direction opposite said one axial direction so as to normally engage in abutment a first stationary stop defining a rest position for said first connecting means, said coupling means including an eccentric wedging member rotatably supported on said first connecting part and adapted to selectively come into engagement with an adjacent surface of the second connecting part upon pivotal movement of said eccentric wedging member from a rest position, said eccentric wedging member being displaced positively towards its said rest position by cooperating in engagement with a second stationary stop when said first connecting part reaches its said rest position.

6. A device according to claim 5, wherein said first and second stationary stops are formed by a stationary casing encasing said connecting parts.

7. A device according to claim 5, further comprising a spring biasing said eccentric wedge member for pivotal movement away from its said rest position.

* * * * *